United States Patent
Hong et al.

(10) Patent No.: US 11,560,319 B1
(45) Date of Patent: Jan. 24, 2023

(54) MANUFACTURING METHOD FOR SPHERICAL YOF-BASED POWDER, AND SPHERICAL YOF-BASED POWDER AND YOF-BASED COATING LAYER MANUFACTURED THEREBY

(71) Applicant: KOMICO LTD., Anseong-si (KR)

(72) Inventors: Ki Won Hong, Anseong-si (KR);
Seong Sik Bang, Anseong-si (KR);
Dong Hun Jeong, Anseong-si (KR)

(73) Assignee: KOMICO LTD., Anseong-si (KR)

( * ) Notice: Subject to any disclaimer, the term of this patent is extended or adjusted under 35 U.S.C. 154(b) by 0 days.

(21) Appl. No.: 17/849,365

(22) Filed: Jun. 24, 2022

(30) Foreign Application Priority Data

Nov. 1, 2021 (KR) .................. 10-2021-0147735

(51) Int. Cl.
*C01F 17/259* (2020.01)
*C23C 4/134* (2016.01)
*C23C 4/04* (2006.01)
*H05H 1/34* (2006.01)

(52) U.S. Cl.
CPC .............. *C01F 17/259* (2020.01); *C23C 4/04* (2013.01); *C23C 4/134* (2016.01); *C01P 2004/32* (2013.01); *C01P 2004/61* (2013.01); *H05H 1/34* (2013.01)

(58) Field of Classification Search
None
See application file for complete search history.

(56) References Cited

U.S. PATENT DOCUMENTS

2021/0115548 A1* 4/2021 Allimant .................. C23C 4/10

FOREIGN PATENT DOCUMENTS

| CN | 104981431 B | 6/2018 |
|---|---|---|
| CN | 111670164 A | 9/2020 |
| KR | 20190017333 A | 2/2019 |
| KR | 20190082119 A | 7/2019 |
| KR | 20200122310 A | 10/2020 |

OTHER PUBLICATIONS

Notice of Grant of Patent of foreign patent application (from KIPO), English translation (Year: 2022).*

* cited by examiner

*Primary Examiner* — Colin W. Slifka
(74) *Attorney, Agent, or Firm* — STIP Law Group, LLC

(57) ABSTRACT

Proposed is a method for manufacturing a spherical YOF-based powder. Specifically, proposed is a method for manufacturing a spherical YOF-based powder. The YOF-based powder injected into the plasma jet and melted into the refrigerant in a droplet state is sprayed and quenched, thereby improving density and controlling the component ratio through particle spheroidization.

9 Claims, 5 Drawing Sheets

MANUFACTURING METHOD FOR SPHERICAL YOF-BASED POWDER, AND SPHERICAL YOF-BASED POWDER AND YOF-BASED COATING LAYER MANUFACTURED THEREBY

CROSS-REFERENCE TO RELATED APPLICATION

The present application claims priority to Korean Patent Application No. 10-2021-0147735 filed on Nov. 1, 2021, the entire contents of which is incorporated herein for all purposes by this reference.

BACKGROUND OF THE INVENTION

1. Field of the Invention

The present disclosure relates to a method for manufacturing a spherical YOF-based powder. The present disclosure relates to a method for manufacturing a spherical YOF-based powder, the method controlling the density and component ratio of particles through spheroidization of the YOF-based powder, thereby enabling a coating film famed from the powder to be improved density, hardness, and plasma resistance.

2. Description of the Related Art

Recently, high integration of semiconductor processes and ultra-fine line width technology require plasma etching processes under extreme environments such as high-density plasma, high cleanliness, and excessive electrical impact. In particular, the plasma etching process using a reactive gas including a halogen element such as F, Cl, or Br, which has strong chemical reactivity, etches various deposition materials on the wafer surface and, at the same time, chemically and physically reacts with metal or ceramic components inside the chamber. This causes damage to the surface of the part and the generation of non-volatile contaminants.

Therefore, recently, interest in coating a ceramic material having excellent plasma resistance on a surface of a ceramic component has been significantly increased, and yttrium oxide ($Y_2O_3$) coating has been widely applied.

Yttrium oxide ($Y_2O_3$) exhibits a high melting point (2,450° C.), chemical stability, and crystallographic stability up to 2300° C. In particular, $Y_2O_3$ exhibits excellent plasma resistance due to excellent chemical stability against F radical, high ion collision resistance according to the high atomic mass of yttrium, and excellent mechanical properties of $YF_3$, which is a reaction product.

However, when the upper surface of the $Y_2O_3$ coating layer reacts with plasma gases such as $SF_6$, $CF_4$, $CHF_3$, and HF at the beginning of the etching process, a change in the fluorine-based gas concentration in the chamber occurs, increasing the seasoning time of the etching process. Contamination particles including fluorine are formed by the reaction between the surface and the plasma gas, and when $Y_2O_3$ is subjected to a thermal cycle, stress is generated due to a difference in thermal expansion coefficient between the contaminated particles and $Y_2O_3$, and there is a problem in that the contaminant particles are removed.

YF3 with excellent corrosion resistance was introduced to solve this problem. However, The YF3 is melted by ultra-high temperature plasma during an atmospheric plasma spraying (APS) process, and a part of the fluoride is oxidized to form a coating layer partially mixed with fluoride and an oxide. In addition, cracks in the coating layer and particles in the etching chamber may cause many problems as compared to the $Y_2O_3$ thermal sprayed coating layer.

In order to solve the problems of $Y_2O_3$ and $YF_3$, a Y—O—F coating layer having intermediate properties of $Y_2O_3$ and $YF_3$ was introduced.

For example, in Korean Patent Application Laid-Open No. 10-2019-0017333 (published on Feb. 20, 2019), disclosed is a method for manufacturing a YOF-based powder that may be applied to coating semiconductor equipment due to low generation of contaminated particles and excellent plasma resistance by mixing yttrium oxide ($Y_2O_3$) powder and $YF_3$ powder in a weight ratio of 1:2 to 2:1. However, in the case of the preceding literature, only the particle size of YOF is reduced, and the improvement of shape and porosity is not disclosed at all. Therefore, in the case of the coating layer made of the YOF-based powder described above, the porosity is formed as high as 3% or more, and thus the density is reduced, thereby also reducing the mechanical strength.

Therefore, in order to improve the problems of the YOF-based powder, research is being conducted to improve the physical strength and chemical stability of the coating layer using the YOF-based powder by improving the porosity and component ratio.

As an example, in Korean Patent Publication No. 10-2019-0082119 (published date: 2019.07.09), disclosed is a coating film with high etching resistance to corrosive gases and high-velocity collision ion particles and excellent plasma resistance by forming a YOF coating film on a substrate using a mixed powder containing Y, O, and F, but the Y:O:F component by XPS is 1:1:1, reducing porosity to 0.01% to 1.0%, improving hardness to 6 to 12 GPa. However, in the case of the preceding literature, the component ratio of Y, O, and F is 1:1:1, and the content of F is still high, so in the case of a coating film using the same, $F^-$ ion gas is mixed into the semiconductor process during some etching processes, causing problems such as increasing the etching rate.

Therefore, when the content ratio of F and the porosity of the YOF-based powder is adjusted and applied as a coating film, the development of the YOF-based powder with excellent chemical stability, plasma resistance, and improved strength even in the process of using oxygen radicals and fluorine-based plasma gas at the same time, is required.

DESCRIPTION OF THE RELATED ART

Patent Literatures (Patent literature 1), Korean Patent Application Publication No. 10-2019-0017333 (published date: 2019.02. 20.)
(Patent literature 2), Korean Patent Application Publication No. 10-2019-0082119 (published date: 2019.07. 09)

SUMMARY OF THE INVENTION

A first solution of the present disclosure is to provide a method for manufacturing a spherical YOF-based powder that not only has plasma resistance with chemical stability but also stabilizes the YOF-based powder coating layer by improved hardness in the process of simultaneously using oxygen radicals and fluorine-based plasma gas by densifying these particles and controlling the F component content while maintaining high plasma resistance of a conventional YOF-based powder.

In addition, a second solution of the present disclosure is to provide a spherical YOF-based powder manufactured by the method for manufacturing the spherical YOF-based powder.

In addition, a third solution of the present disclosure is to provide a YOF-based coating layer manufactured by APS coating the YOF-based powder.

In order to solve the above problem, a method for manufacturing a spherical YOF-based powder, the method includes: (a) melting YOF-based powder by introducing the YOF-based powder into a plasma jet; (b) manufacturing a spherical YOF-based powder by spraying the molten YOF-based droplets to a refrigerant; and (c) removing the refrigerant after step (b) and drying the spherical YOF-based powder.

In one embodiment, in step (b), when the molten YOF-based droplet is sprayed, the separation distance from the injection outlet to the surface of the refrigerant body may be 400 to 600 mm, and the refrigerant may be at least one selected from water, $N_2$, and Ar.

In one embodiment, the YOF-based powder may be a powder having a formula of $Y_xO_yF_z$ (where x and z are numbers greater than or equal to y).

In addition, the present disclosure provides a spherical YOF-based powder manufactured by the method for manufacturing the spherical YOF-based powder.

In one embodiment, the particle size of the spherical YOF-based powder may be 10 to 60 μm.

In addition, the present disclosure provides a YOF-based coating layer, which is manufactured by coating the spherical YOF-based powder on a substrate by an atmospheric plasma spraying (APS) method.

In an embodiment, the F content of the YOF-based coating layer may be 20% to 40% by weight, and the porosity of YOF-based coating layer may be less than 2%.

In the case of the present disclosure, by spheroidizing the YOF-based powder through a simple process, the structure may be densified to prepare a high-density yttrium compound powder.

In addition, when the spherical densified YOF-based powder is coated on the substrate by the APS coating method, the porosity is reduced to form a dense and stable coating film, and in particular, a coating layer formed by a spherical YOF-based powder exhibits an effect of improving hardness compared to a conventional non-spheroidized YOF-based powder. This improvement in mechanical strength means that resistance to ion bombardment generated in the dry etching process is increased.

In addition, by appropriately controlling the content of F of the yttrium compound powder of the coating layer, the yttrium compound powder may have excellent chemical stability and plasma resistance even in the process of simultaneously using oxygen radicals and fluorine-based plasma gas.

DESCRIPTION OF THE PREFERRED EMBODIMENTS

Unless defined otherwise, all technical and scientific terms used herein have the same meaning as commonly understood by those of ordinary skilled in the art to which this disclosure belongs. In general, the nomenclature used herein is well-known and commonly used in art.

When a part of the present specification "includes" a component throughout the present specification, this means that it may further include other components rather than excluding the other component unless otherwise opposed.

In addition, "non-spheroidization" throughout this specification means a state that has not undergone the spheroidization process described in the present disclosure.

One embodiment of the present disclosure provides a method for manufacturing a spherical YOF-based powder, the method includes: (a) melting by introducing the YOF-based powder into a plasma jet; (b) manufacturing a spherical YOF-based powder by spraying the molten YOF-based droplets to a refrigerant; and (c) removing the refrigerant after step (b) and drying the spherical YOF-based powder.

Figure 1:
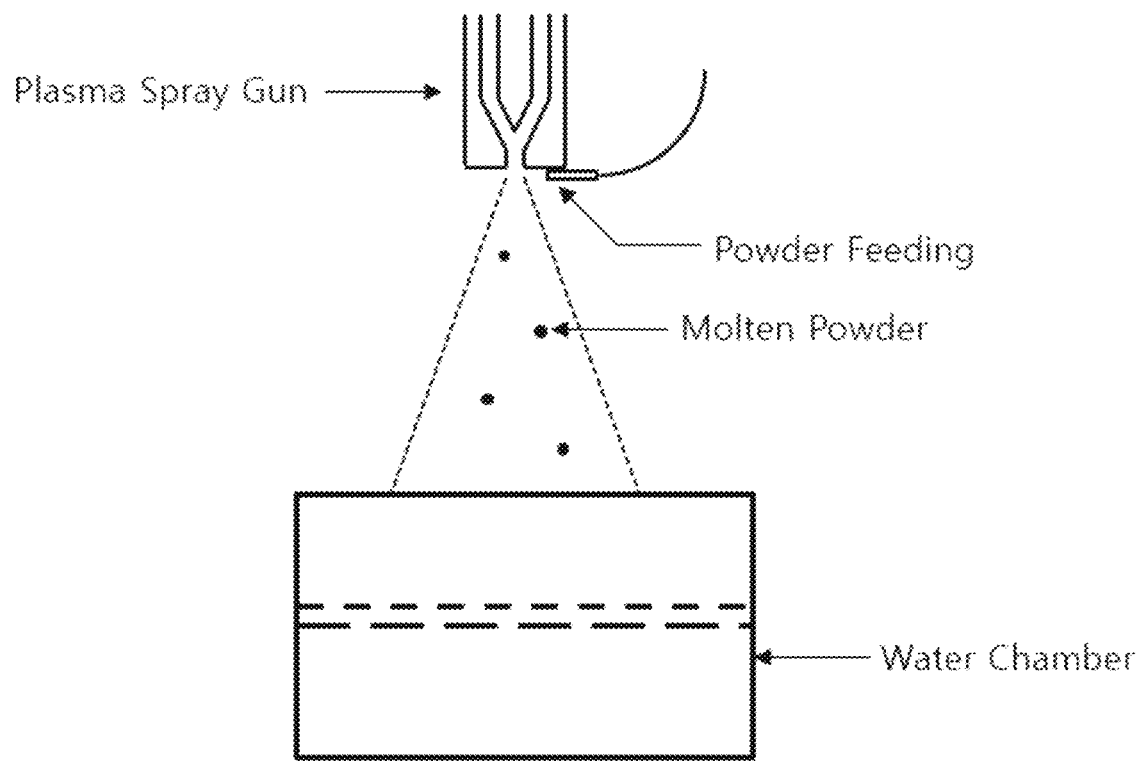
FIG. 1 shows a schematic diagram of a method for manufacturing a spherical YOF-based powder according to an embodiment of the present disclosure.
Figure 2:
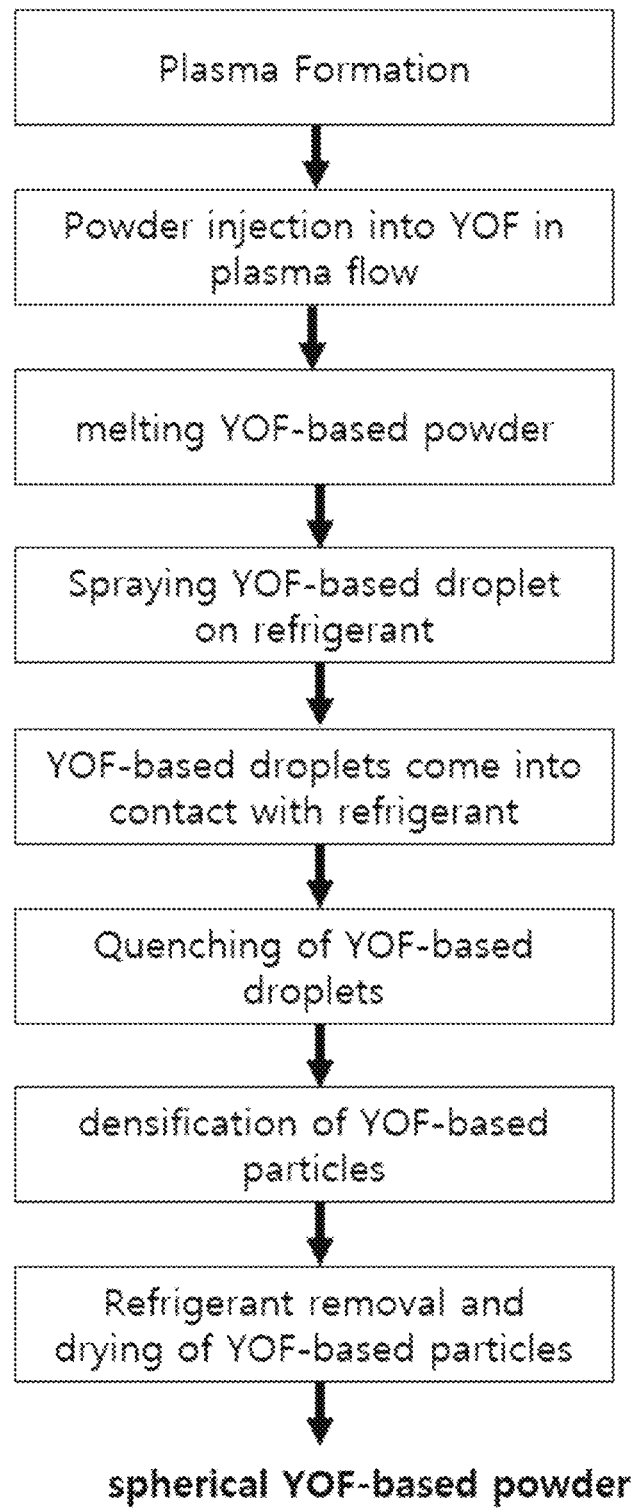
FIG. 2 is a flowchart showing a method for manufacturing a spherical YOF-based powder according to the present disclosure.

FIGS. 1 and 2 show a schematic diagram and flowchart of a method for manufacturing a spherical YOF-based powder according to an embodiment of the present disclosure; with reference to this, it will be described in detail below.

In the present disclosure, step (a) is melting by introducing the YOF-based powder into a plasma jet.

When generating thermal plasma in a plasma device, an arc discharge is made between the cathode and the anode while flowing a large amount of gas so that the plasma is ejected in a jet state. This is called a plasma jet or a plasma torch, and in step (a), the YOF-based powder is injected into the plasma jet to melt the YOF-based powder within a short time. In this case, the YOF-based powder may be a powder having a formula of $Y_xO_yF_z$ and is not limited to specific material, but the YOF-based powder may be a formula of $Y_xO_yF_z$, where x and z may be greater than or equal to y and may be YOF, $Y_5O_4F_7$, $Y_6O_5F_8$, $Y_7O_6F_9$. The plasma apparatus may have a temperature sufficient to melt the YOF-based powder, and preferably, may be an atmospheric plasma spraying (APS) apparatus.

Next, step (b) is manufacturing a spherical YOF-based powder by spraying the molten YOF-based droplets into the refrigerant, in which a spherical YOF-based powder is manufactured by quickly spraying the melted YOF-based droplets into the refrigerant with a separation distance of 400 to 600 mm from the injection outlet to the refrigerant surface and a refrigerant is using any one or more selected from water, $N_2$, and Ar.

Specifically, the separation distance refers to the distance from the injection outlet of the plasma spray gun to the surface of the refrigerant, and the separation distance is set to 400 to 600 mm so that the molten YOF-based droplets can be sprayed toward the refrigerant without loss to exhibit a rapid cooling effect while improving the yield. When the separation distance is less than 400 mm, the loss of solvent and powder due to the injection pressure is significant, and when the separation distance exceeds 600 mm, the yield is degraded due to the spraying angle, and it is difficult to achieve a sufficient quenching effect of the melted powder, and thus the separation distance is desirably 400 to 500 mm.

In addition, the refrigerant is to rapidly cool the sprayed molten yttrium compound droplets to make them spherical and high-density. Specifically, the molten YOF-based droplets quickly sprayed into the refrigerant are quenched by rapid cooling, and the YOF-based droplets are formed in a spherical shape to minimize surface energy and are highly densified, thereby improving hardness. In this case, the refrigerant may be any one or more selected from water, $N_2$, and Ar, and the composition ratio of the spherical YOF system manufactured according to the refrigerant may be adjusted. For example, when molten YOF-based droplets are rapidly sprayed to distilled water ($H_2O$) and quenched by rapid cooling, the F component of the YOF-based yttrium compound reacts with the H component of the distilled water to form hydrogen fluoride, and the F content is reduced. When $N_2$ is used as a refrigerant, a reaction does not occur with the YOF-based yttrium compound and is rapidly cooled, thereby not causing a reduction in the F content. In this way, by adjusting the refrigerant, the composition ratio of the YOF-based powder to be manufactured can be adjusted, and the refrigerant is generally distilled water at room temperature.

Next, step (c) is removing the refrigerant after step (b) and drying the spherical YOF-based powder. The refrigerant removal and the drying of the spherical YOF-based powder may be performed by a conventional method and thus will not be described in detail.

In addition, in the manufacturing method of the spherical YOF-based powder of the present disclosure, the YOF-based powder may contain the F component. Therefore, to ensure corrosion resistance to HF that may occur during spheroidization, the container used is applied with a Teflon coating of 50 μm or more or is made of a ceramic material.

The spherical YOF-based powder manufactured by the above method has a spherical particle size of 10 to 60 μm. In general, the smaller the diameter of the YOF particles, the more denser the coating layer can be formed. However, when the diameter of the particles is less than 10 μm, a technical problem in which feeding is not performed occurs due to a cohesive force generated due to a close distance between particles. Therefore, the spherical YOF-based powder of the present disclosure may form a high-density film without agglomeration during coating while densifying the density by setting the particle size to 10 to 60 μm, preferably 25 to 45 μm.

In addition, the manufactured spherical YOF-based powder has a structural difference from the non-spheroidized YOF-based powder. For example, when non-spheroidized YOF is spheroidized, the specific gravity of $YF_3$, which is an orthorhombic structure, is decreased, and the specific gravity of YOF, which is an orthorhombic structure, is increased.

In addition, the present disclosure provides a YOF-based coating layer, which is manufactured by coating the spherical YOF-based powder on a substrate by an atmospheric plasma spraying (APS) method.

Atmospheric plasma spraying (APS) is a type of thermal spray technology that converts powder or linear material into molten liquid through a high-temperature heat source and collides with a substrate at high speed to rapidly cool and solidify to form a laminated film. Specifically, it is a film-forming technology in which a gas such as Ar, He, and $N_2$ is converted into arc plasma and emitted from a nozzle to use an ultra-high temperature and high-speed plasma jet as a heat source. While the molten spraying material collides with the substrate at high speed and thus, a high adhesion strength and high-density film may be manufactured, since the spraying is performed under an atmosphere of atmospheric pressure, surrounding air is mixed into the plasma jet flame, thereby having high porosity and, according to the film material, an oxide or impurities may be mixed.

The YOF-based coating layer manufactured by coating the manufactured spherical yttrium compound powder on a substrate by this APS method has a porosity densified to less than 2% and a hardness of 550 Hv or more, which significantly improves mechanical properties compared to the non-spheroidized YOF-based coating layer, thereby increasing resistance to ion bombardment generated in a dry etching process.

Specifically, the increase in resistance to ion bombardment is due to a change in the crystal structure. This is because a coating layer having an F content while having a crystal structure close to that of $Y_2O_3$ is formed of the YOF-based powder due to the oxidation generated during the spheroidization process of manufacturing spherical YOF-based powder, which is a feeding material for foaming the coating layer, and additional oxidation generated during coating by the APS. That is, the YOF coating layer, according to the present disclosure, has a crystal structure close to the crystal structure of $Y_2O_3$ and also has F replaced with a part of the 0 site, and thus is coated in a kind of solid solution form, such that physical characteristics are close to $Y_2O_3$ and chemical characteristics are close to YOF.

In addition, the F content of the YOF coating layer is 20% to 40% by weight, and the oxygen content may be changed according to the F content, and preferably the oxygen content may be 30% to 50% by weight.

Since oxidation is generated as the spherical yttrium compound, YOF powder is melted by high-temperature plasma when the YOF coating layer is formed, although the oxygen content tends to be increased, and the F content tends to be reduced, the oxygen content increase and the F content decrease are controlled to include F in an amount of 20% to 40% by weight.

When the F content is less than 20% by weight, the corrosion resistance of the coating layer to $CF_4$ gas decreases. When the F content exceeds 40% by weight, the etching rate of the wafer increases in the etching process, resulting in additional customer process conditions change, at the same time, the hardness of the coating layer is lowered and resistance to physical etching may be reduced. In this case, the content of 0 of the spherical YOF-based powder may be 30 to 50 at % as a value changed according to the content of F.

Hereinafter, the present disclosure will be described in detail through Examples, but the present disclosure is not limited by the Examples.

Example

1. Spheroidization of YOF Powder

Preparation Example 1: Spheroidization of YOF

According to the schematic diagram of FIG. 1 and the process flowchart of FIG. 2, a spheroidizing treatment was performed on commercially available YOF powder.

According to FIGS. 1 and 2, a plasma was first formed in a plasma apparatus, and then YOF powder was injected into the plasma stream to uniformly heat the YOF powder. In this case, conditions such as plasma formation conditions and powder injection angle, etc., were performed according to Table 1 below.

Thereafter, the heated YOF powder was sprayed in the form of molten droplets toward the cooling medium water at a separation distance of 200 to 800 mm. The YOF droplets were quenched by contact with water, and YOF was manufactured as densified spheres by the above process.

Finally, the densified spherical YOF was separated from water and dried. The densified spherical YOF powder was manufactured through the above process, and they were manufactured in Preparation Examples 1 to 7 according to the separation distance.

TABLE 1

| Voltage V | Electric current A. | Electric power (kW) | Injection gas 1. | Injection gas 1 Injection volume (NLPM) | Injection gas 2. | Injection gas 2. Injection volume (NLPM) | Powder Injection method | Powder Injection angle |
|---|---|---|---|---|---|---|---|---|
| 75 to 78 | 600 to 610 | 44 to 48 | Ar | 40 to 44 | H2 | 9 to 13 | Single/ Double | 90 to 105 |

Control 1: Non-Spheroidized YOF

Commercially available YOF used in Preparation Example 1 was used as Control 1.

Control 2: Non-Spheroidized Mixed Method YOF ($YF_3$ + $Y_2O_3$)

A YOF obtained by mixing commercially available $YF_3$ powder and commercially available $Y_2O_3$ powder in a ratio of 1:1 was used as Control 2.

Table 2 below shows the yield, spheroidization rate, and separation distance during manufacturing of Preparation Examples 1 to 7 and the spheroidization of Controls 1 and 2.

TABLE 2

| | Yttrium compound | Separation distance (mm) | Yield (%) | Spheroidization |
|---|---|---|---|---|
| Preparation Example 1: | YOF | 200. | Not measurable | x |
| Preparation Example 2: | | 300. | 70. | ○ |
| Preparation Example 3: | | 400. | 84. | ○ |
| Preparation Example 4: | | 500. | 90. | ○ |
| Preparation Example 5: | | 600. | 87. | ○ |
| Preparation Example 6: | | 700. | 80. | ○ |
| Preparation Example 7: | | 800. | 75. | ○ |
| Control 1: | YOF | — | — | x |
| Control 2: | Mixed YOF ($YF_3$ + $Y_2O_3$ = 1:1) | | | x |

2. YOF Coating Layer Formation

<Example 1> Formation of Coating Layer by Densified Spherical YOF

Using the manufactured densified spherical YOF powder (Preparation Example 4), a YOF coating layer was formed by the APS method under the conditions shown in Table 3 below.

TABLE 3

| Voltage V | Electric current A. | Electric power (kW) | Gas 1 | Injection volume (NLPM) | Gas 2 | Injection volume (NLPM) | Rotation speed | Transfer pressure (NLPM) | Separation distance (mm) |
|---|---|---|---|---|---|---|---|---|---|
| 75 to 78 | 600. | 44 to 48 | Ar | 40 to 44 | $H_2$ | 11 to 13 | 25 to 30 | 3.5 to 4.0 | 110 to 130 |

<Comparative Example 1> Formation of Non-Spheroidized YOF Coating Layer

A YOF coating layer was formed in the same manner as in Example 1, except that the non-spheroidized YOF powder (control group 1) was used.

<Comparative Example 2> Formation of Non-Spheroidized Mixing Method YOF (YF3+Y2O3) Coating Layer A YOF coating layer was formed in the same manner as in Example 1, except that the non-spheroidized mixing method YOF powder (control group 2) was used.

3. YOF Powder Analysis (1) Analysis of Sphericity and Physical Properties of YOF Powder FIG. 3 shows SEM images of the prepared spheroidized YOF (Preparation Example 4) and non-spheroidized YOF (control group 1).

Figure 3:
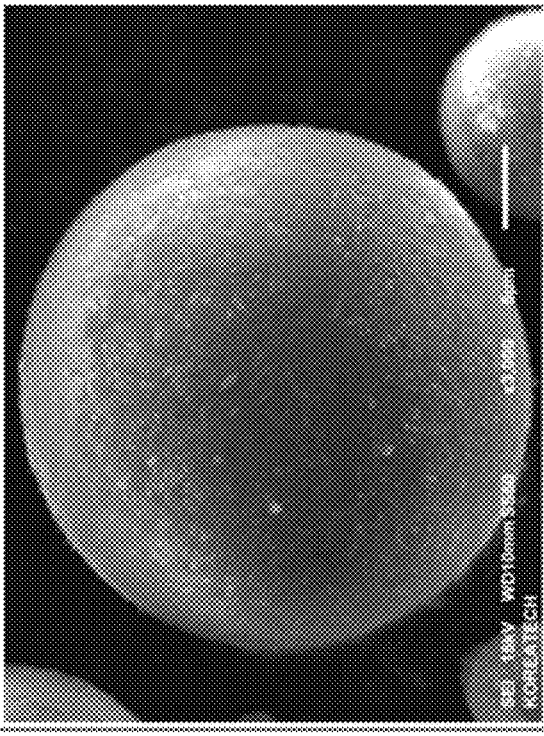
FIG. 3 shows an SEM photograph of YOF powder before/after spheroidization according to an embodiment of the present disclosure.

The spheroidized YOF powder in FIG. 3 has a D 50 of 26.8 μm, whereas the non-spheroidized YOF powder has a D 50 of 28.8 μm. Since the diameter is reduced, the volume is reduced, and the density is increased, it may be seen that the YOF powder is densified by spheroidization.

(3) Structural Analysis of YOF Powder

Figure 4:
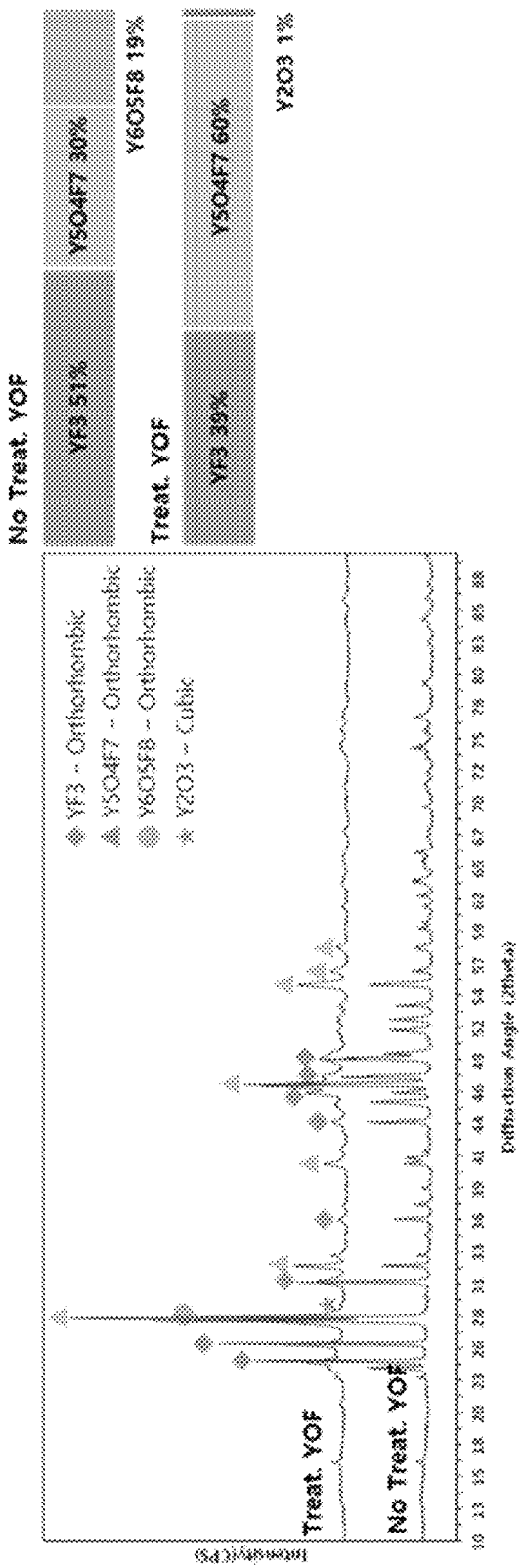
FIG. 4 is an XRD graph showing the crystal structure of spheroidized and non-spheroidized YOF powder according to an embodiment of the present disclosure.

FIG. 4 shows XRD images of the prepared spheroidized YOF (Preparation Example 4) and non-spheroidized YOF (control group 1).

In FIG. 4, in the non-spheroidized YOF before the spheroidization treatment, $YF_3$ and $Y_5O_4F_7$ of orthorhombic structure had 51% and 30%, respectively, but by the spheroidization treatment, $YF_3$ and $Y_5O_4F_7$ of the orthorhombic structure had their structures changed to 39% and 60%, respectively.

Through this, it can be seen that the structure of YOF is changed by the spheroidization process.

4. YOF Coating Layer Analysis (1) Analysis of Coating Layer Properties Before/after Spheroidization FIG. 5 shows a SEM photograph of a coated cross-section of Example 1 and Comparative Example 1 in which a coating layer was formed with APS using spheroidized YOF (Preparation Example 4) and non-spheroidized YOF (control group 1), and Table 4 is a comparison of their physical properties.

TABLE 4

|  | <Example 1> | <Comparative Example 1> |
|---|---|---|
| Hardness (Hv) | >550 | <400 |
| Porosity (%) | <2 | >5 |
| Roughness (μm) | 3 to 4 | 4 to 5 |

Figure 5:
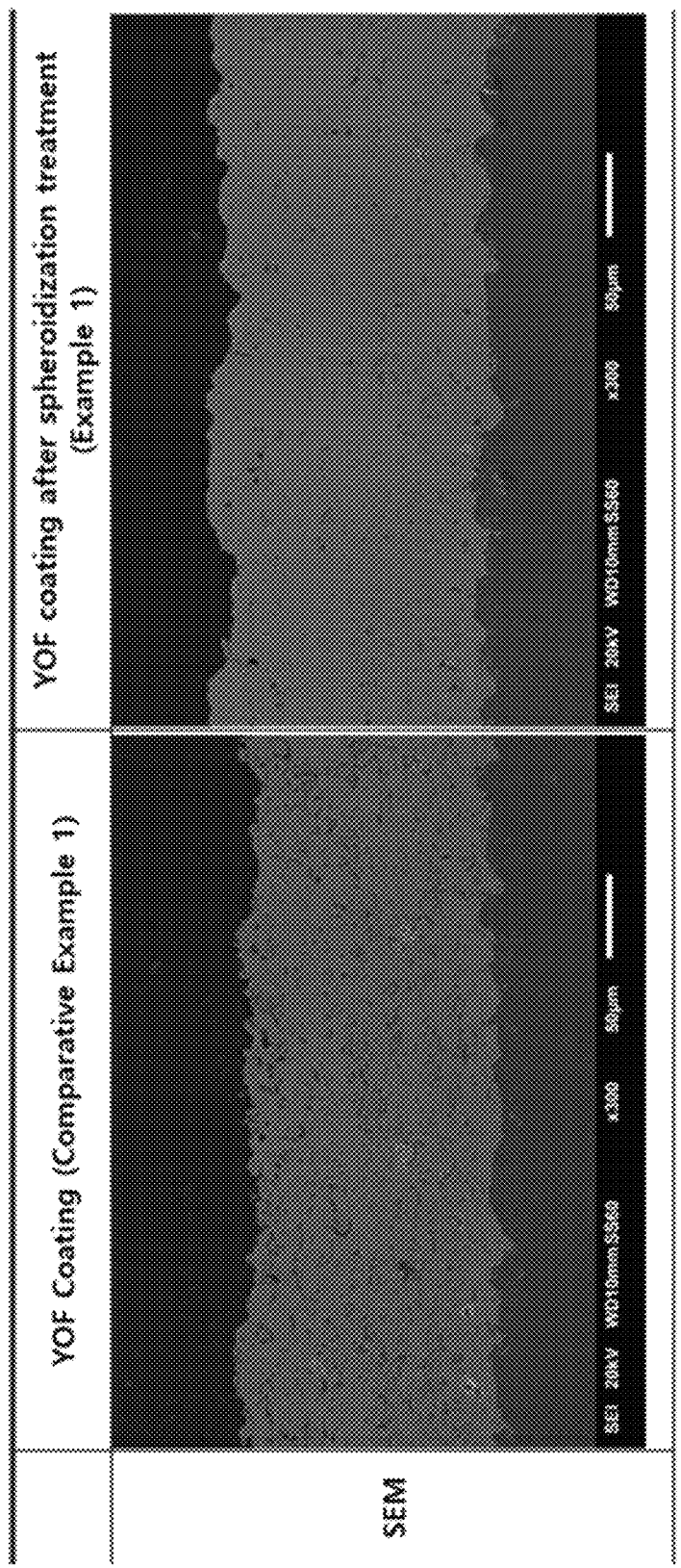
FIG. 5 shows a SEM photograph of YOF coated cross-section before/after spheroidization according to an embodiment of the present disclosure.

The YOF coating layer (Example 1) formed by the APS method using the YOF powder spheroidized through FIG. 5 and Table 4 above had a surface roughness of 3 to 4 μm and a porosity of less than 2%. It may be seen that the coating layer is formed to be uniform and high-density, and the hardness is improved to more than 550 Hv as the coating layer is highly densified.

On the other hand, the YOF coating layer formed by the APS method using non-spheroidized YOF powder (Comparative Example 1) had a surface roughness of 4 to 5 μm and a porosity of more than 5%. It may be seen that a non-uniform and non-dense coating layer is formed, and thus hardness is also lowered to less than 400 Hv.

From the above results, when the YOF coating layer is formed with the APS method using the spheroidized YOF powder, it may be seen that the surface roughness and porosity are reduced to form a relatively uniform and densified high-density coating layer, and the hardness of the coating layer by densification can also be improved.

(2) Analysis of Coating Layer Properties Before/after Spheroidization

Table 5 below shows the XPS analysis results for the yttrium coating layer (Example 1, Comparative Examples 1 and 2) coated with the spheroidized or non-spheroidized yttrium compound with the APS method.

TABLE 5

|  | Yttrium compound | Spheroidization | O (at. %) | F (at. %) | Y (at. %) |
|---|---|---|---|---|---|
| <Example 1> | YOF | ○ | 45. | 20. | 35. |
| <Comparative Example 1> | YOF | x | 30. | 40. | 30. |
| <Comparative Example 2> | Mixed YOE ($YF_3$ + $Y_2O_3$ = 1:1) | x | 15. | 55. | 30. |

In Table 5, both Example 1 and Comparative Example 1, which are YOF coating layers coated with the APS method using spheroidized YOF and non-spheroidized YOF, contain appropriate F contents of 20% and 40% by weight, so has sufficient corrosion resistance to the halogen etching gas. However, while the YOF coating layer (Example 1) coated with the APS method using the spheroidized YOF was formed as a uniform and high-density coating layer to improve physical properties, in the case of the YOF coating layer (Comparative Example 1) coated with the APS method using non-spheroidized YOF, as shown in Table 5, the YOF coating layer is formed as a non-uniform and non-dense coating layer and thus has low physical properties.

On the other hand, the YOF coating layer (Comparative Example 3) coated with the APS method using the non-spheroidized mixed YOF contains excessively F at 55% by weight, which rather increases the etching rate of the wafer, resulting that the wafer etching process conditions are distorted, and the hardness of the coating layer is reduced, thereby reducing resistance to physical etching.

What is claimed is:

1. A method for manufacturing a spherical YOF-based powder, the method comprising:
    (a) melting YOF-based powder by introducing the YOF-based powder into a plasma jet;
    (b) manufacturing a spherical YOF-based powder by spraying the molten YOF-based droplets to a refrigerant; and
    (c) removing the refrigerant after step (b) and drying the spherical YOF-based powder,
    wherein in step (b), when the molten YOF-based droplets are sprayed, a separation distance from an injection outlet to a surface of the refrigerant is in a range of 400 to 600 mm.

2. The method of claim 1, wherein the refrigerant is any one or more selected from water, $N_2$, and Ar.

3. The method of claim 1, wherein the YOF-based powder has a formula of $Y_xO_yF_z$ (where x and z are numbers greater than or equal to y).

4. A spherical YOF-based powder manufactured by the method of claim 1.

5. The spherical YOF-based powder of claim 4, wherein the spherical YOF-based powder has a particle size of 10 to 60 μm.

6. A YOF-based coating layer manufactured by applying the spherical YOF-based powder of claim 5 on a substrate through an atmospheric plasma spraying (APS) method.

7. A YOF-based coating layer manufactured by applying the spherical YOF-based powder of claim 4 on a substrate through an atmospheric plasma spraying (APS) method.

8. The YOF-based coating layer of claim 7, wherein the content of F in the YOF-based coating layer is 20% to 40% by weight.

9. The YOF-based coating layer of claim 7, wherein the YOF-based coating layer has a porosity of less than 2%.

\* \* \* \* \*